(12) United States Patent
Vishlitzky et al.

(10) Patent No.: US 7,340,489 B2
(45) Date of Patent: Mar. 4, 2008

(54) VIRTUAL STORAGE DEVICES

(75) Inventors: Natan Vishlitzky, Brookline, MA (US); Haim Kopylovitz, Brookline, MA (US); Hana Moreshet, Framingham, MA (US); Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 969 days.

(21) Appl. No.: 10/120,016

(22) Filed: Apr. 10, 2002

(65) Prior Publication Data
US 2003/0195886 A1 Oct. 16, 2003

(51) Int. Cl.
*G06F 12/00* (2006.01)
*G06F 17/30* (2006.01)

(52) U.S. Cl. ............... 707/203; 707/202; 707/204
(58) Field of Classification Search ......... 707/200–204
See application file for complete search history.

(56) References Cited

U.S. PATENT DOCUMENTS

| | | | |
|---|---|---|---|
| 5,206,939 A | 4/1993 | Yanai et al. | 711/133 |
| 5,381,539 A | 1/1995 | Yanai et al. | 711/4 |
| 5,778,394 A | 7/1998 | Galtzur et al. | 707/205 |
| 5,784,698 A * | 7/1998 | Brady et al. | 711/171 |
| 5,819,292 A * | 10/1998 | Hitz et al. | 707/203 |
| 5,845,147 A | 12/1998 | Vishlitzky et al. | 710/5 |
| 5,857,208 A * | 1/1999 | Ofek | 707/204 |
| 5,915,264 A | 6/1999 | White et al. | 711/168 |
| 6,076,148 A | 6/2000 | Kedem et al. | 711/162 |
| 6,311,193 B1 | 10/2001 | Sekido | 707/202 |
| 6,446,176 B1 * | 9/2002 | West et al. | 711/162 |
| 6,460,054 B1 * | 10/2002 | Grummon | 707/204 |
| 2002/0156975 A1 * | 10/2002 | Staub et al. | 711/114 |
| 2003/0097611 A1 * | 5/2003 | Delaney et al. | 714/13 |
| 2003/0140070 A1 * | 7/2003 | Kaczmarski et al. | 707/204 |

(Continued)

FOREIGN PATENT DOCUMENTS

EP 1065585 A2 1/2001

OTHER PUBLICATIONS

Schwartz, A.M. et al. "LFS—A Local File System for Multiprocessor NFS Network Servers", Auspex Systems Inc. Technical Report 4, Dec. 1989.*

(Continued)

*Primary Examiner*—Luke S Wassum
(74) *Attorney, Agent, or Firm*—Muirhead and Saturnelli, LLC

(57) ABSTRACT

Accessing stored data includes providing a virtual storage area having a table of pointers that point to sections of at least two other storage areas, where the virtual storage area contains no sections of data, in response to a request for accessing data of the virtual storage area, determining which particular one of the other storage areas contain the data, and accessing the data on the particular one of the other storage areas using the table of pointers. Accessing stored data may also include associating a first one of the other storage areas with the virtual storage area, where the virtual area device represents a copy of data of the first one of the other storage areas. Accessing stored data may also include causing all of the pointers of the table to initially point to sections of the first one of the other storage areas when the virtual storage area is initially associated with the first one of the other storage areas. The storage areas may be storage devices. The sections may be tracks.

26 Claims, 14 Drawing Sheets

U.S. PATENT DOCUMENTS

2003/0158834 A1* 8/2003 Sawdon et al. ............... 707/1
2004/0139125 A1* 7/2004 Strassburg et al. .......... 707/202

OTHER PUBLICATIONS

Hitz, D. et al. "Using UNIX as One Component of a Lightweight Distributed Kernel for Multiprocessor File Servers", Auspex Systems Inc. Technical Report 5, Jan. 1990.*

Chutani, S. et al. "The Episode File System", Proceedings of the USENIX Winter Conference, pp. 43-60, 1992.*

Hitz, D. "An NFS File Server Appliance", Technical Report TR01, Network Appliance Corporation, Aug. 1993.*

Hitz, D. et al. "File System Design for an NFS File Server Appliance", USENIX, Jan. 19, 1994.*

Siddha, S.B. and K. Gopinath "A Persistent Snapshot Device Driver for Linux", Proceedings of the 5th Annual Showcase and Conference, Nov. 5-10, 2001.*

Veritas File System 3.4 Administrator's Guide-Solaris, Nov. 2000, Veitas: Chapter 3 Online Backup and Chapter 8, Storage Checkpoints pp. 23-29, 81-98, XP002324831.

Siddha, et al.: "A Persistent Snapshot Device Driver for Linux," Proceedings of Annual Linux Showcase and Conference, Nov. 10, 2001 pp. 173-182, XP002317993.

* cited by examiner

VIRTUAL STORAGE DEVICES

BACKGROUND OF THE INVENTION

1. Technical Field

This application relates to computer storage devices, and more particularly to the field of providing copies of portions of data stored on a computer storage device.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may nor correspond to the actual disk drives.

In some instances, it may desirable to provide a copy of a logical volume where the copy is then accessed by other processes. For example, to test new software on actual stored data, a copy of a logical volume containing the data may be made and the copy, as opposed to the original data, may be used to test new software. Once the test is complete, the copy may be eliminated. Thus, the new software is tested on actual data without affecting the actual data. This reduces the likelihood that testing new software and/or functionality will corrupt actual data.

One difficulty with making such copies is that they require as much storage space as the logical volume from which the data is obtained since the copy process simply creates a new volume containing all the data of the original volume. In addition, in some instances, the differences between the original volume and the copy are minimal. Thus, the extra storage space required for such a copy of a logical volume is used somewhat inefficiently since it merely duplicates already-existing data. Accordingly, it would be desirable to provide a mechanism for copying data in a way that uses storage space efficiently.

SUMMARY OF THE INVENTION

According to the present invention, accessing stored data includes providing a virtual storage area having a table of pointers that point to sections of at least two other storage areas, where the virtual storage area contains no sections of data, in response to a request for accessing data of the virtual storage area, determining which particular one of the other storage areas contain the data, and accessing the data on the particular one of the other storage areas using the table of pointers. Accessing stored data may also include associating a first one of the other storage areas with the virtual storage area, where the virtual storage area represents a copy of data of the first one of the other storage areas. Accessing stored data may also include causing all of the pointers of the table to initially point to sections of the first one of the other storage areas when the virtual storage area is initially associated with the first one of the other storage areas. Accessing stored data may also include, in response to a write to a first section on the first one of the other storage areas, copying data of the first section to a second section that is on a second one of the other storage areas and causing a corresponding one of the pointers of the table to point to the second section. Prior to copying data from the first section to the second section, the second section may be maintained as a free section containing no data. Accessing stored data may also include maintaining a doubly linked list of all free sections of the second one of the other storage areas. Accessing stored data may also include associating a data indicator with sections of the first one of the other storage areas, where the data indicator for a particular section indicates whether a write operation has been performed to the particular section after the first one of the other storage areas has been associated with the virtual storage area. Accessing stored data may also include, in response to a write to a first section on the first one of the other storage areas and the data indicator indicating that no write operation has been performed to the first section after the first one of the other storage areas has been associated with the virtual storage area, copying data of the first section to a second section that is on a second one of the other storage areas and causing a corresponding one of the pointers of the table to point to the second section. Accessing stored data may also include sending status information to a device that caused the write operation to be performed following copying the data from the first section to the second section. Each of the sections of data may be a track of data. Each of the storage areas may be a storage device.

According further to the present invention, accessing stored data includes providing a first virtual storage area having a first table of pointers that point to sections of at least two other storage areas, where the first virtual storage area contains no sections of data, associating a first one of the other storage areas with the first virtual storage area, where the first virtual storage area represents a copy of data of the first one of the other storage areas at a first point in time, providing a second virtual storage area having a second table of pointers that point to sections of at least two other storage areas, where the second virtual storage area contains no sections of data, associating the first one of the other storage areas with the second virtual storage area, where the first virtual storage area represents a copy of data of the first one of the other storage areas at a second point in time, in response to a request for accessing data of one of the virtual storage areas, determining which particular one of the other storage areas contain the data, and accessing the data on the particular one of the other storage areas using one of the tables of pointers. Accessing stored data may also include causing all of the pointers of the first table to initially point to sections of the first one of the other storage areas when the first virtual storage area is initially associated with the first one of the other storage areas and causing all of the pointers of the second table to initially point to sections of the first one of the other storage areas when the second virtual storage area is initially associated with the first one of the other storage areas. Accessing stored data may further include associating a first data indicator with sections of the first one of the other storage areas, where the first data indicator for a particular section of the first other one of the storage areas indicates whether a write operation has been performed to the particular section after the first one of the other storage areas has been associated with the first virtual storage area, and associating a second data indicator with sections of the first one of the other storage areas, where the second data indicator for a particular section of the first other one of the storage areas indicates whether a write operation has been performed to the particular section after the second one of the other storage areas has been associated with the second virtual storage area. Accessing stored data may also include, in response to a write to a first section that is on the first one of the other storage areas and the data indicator indicating that no write operation has been performed to the first section after the first one of the other storage areas has been associated with the first virtual storage area, copying data of the first section to a second section that is on a second one of the other storage areas and causing a corresponding one of the pointers of the first table to point to the second section. Accessing stored data may also include, in response to a write to a first section that is on the first one of the other storage areas and the data indicator indicating that no write operation has been performed to the first section after the first one of the other storage areas has been associated with the first and second virtual storage areas, copying data of the first section to a second section that is on a second one of the other storage areas and causing a corresponding one of the pointers of the first table and a corresponding one of the pointers of the second table to point to the second section. Accessing stored data may also include, in response to a write to the first virtual storage area corresponding to the second section, copying data from the second section to a third section. Accessing stored data may also include causing a corresponding one of the pointers of the first table to point to the third section. Accessing stored data may also include causing a corresponding one of the pointers of the second table to point to the third section. The first time may be the same as the second time. The first time may be different from the second time. Each of the sections of data may be a track of data. Each of the storage areas may be a storage device.

According further to the present invention, a computer program product includes executable code that provides a virtual storage area having a table of pointers that point to sections of at least two other storage areas, where the virtual storage area contains no sections of data, executable code that determines which particular one of the other storage areas contain the data in response to a request for accessing data of the virtual storage area, and executable code that accesses the data on the particular one of the other storage areas using the table of pointers. The computer program product may also include executable code that associates a first one of the other storage areas with the virtual storage area, where the virtual storage area represents a copy of data of the first one of the other storage areas. The computer program product may also include executable code that causes all of the pointers of the table to initially point to sections of the first one of the other storage areas when the virtual storage area is initially associated with the first one of the other storage areas. The computer program product may also include executable code that copies data of the first section to a second section that is on a second one of the other storage areas and causes a corresponding one of the pointers of the table to point to the second section in response to a write to a first section on the first one of the other storage areas. The computer program product may also include executable code that associates a data indicator with sections of the first one of the other storage areas, where the data indicator for a particular section indicates whether a write operation has been performed to the particular section after the first one of the other storage areas has been associated with the virtual storage area. The computer program product may also include executable code that copies data of the first section to a second section that is on a second one of the other storage areas and causes a corresponding one of the pointers of the table to point to the second section in response to a write to a first section on the first one of the other storage areas and the data indicator indicating that no write operation has been performed to the first section after the first one of the other storage areas has been associated with the virtual storage area. The computer program product may also include executable code that sends status information to a device that caused the write operation to be performed following copying the data from the first section to the second section. Each of the sections of data may be a track of data. Each of the storage areas may be a storage device.

According further to the present invention, a virtual storage device includes at least one table for associating the virtual storage device with a standard storage device, storage for sections of data of the virtual storage device, where a first portion of the storage for sections is sections of data of the standard storage device, and a first plurality of pointers provided with the at least one table, where at least some of the pointers point to sections of the standard storage device corresponding to the first portion. The virtual storage device may also include a second portion of the storage for sections that contain data that is different from data on corresponding sections of the standard storage device that map to the second portion, and a second plurality of pointers provided with the at least one table, where the second plurality of pointers point to sections of a device different from the standard storage device. Each section of the second portion may contain an earlier version of data on a corresponding section of the standard storage device. Each of the sections of data may be a track of data.

DETAILED DESCRIPTION OF VARIOUS EMBODIMENTS

Figure 1:
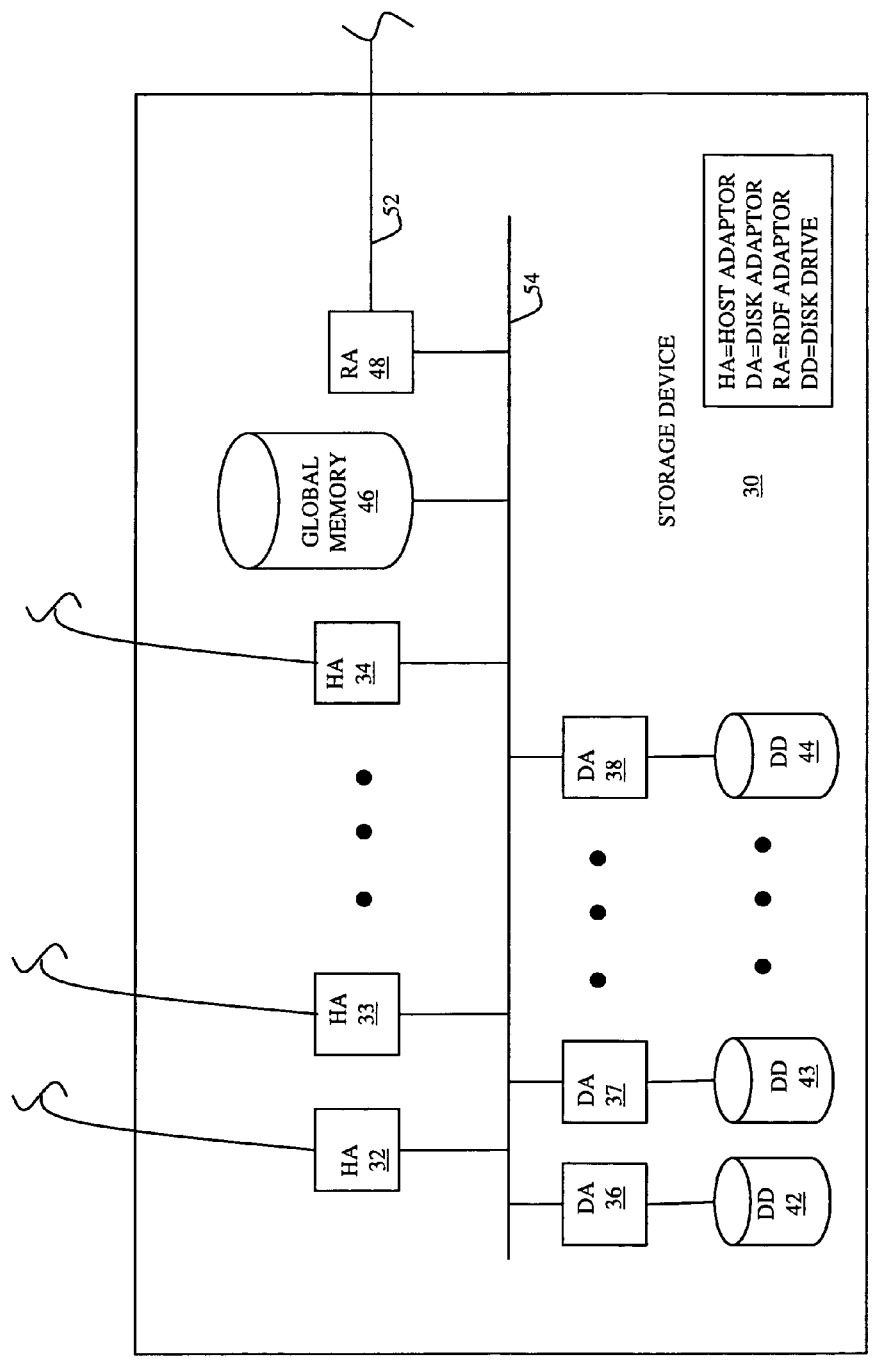
FIG. 1 is a diagram of a storage device used in connection with the system described herein.

Referring to FIG. 1, a storage device 30 includes a plurality of host adapters (HA) 32-34, a plurality of disk adapters (DA) 36-38 and a plurality of disk drives 42-44. Each of the disk drives 42-44 is coupled to a corresponding one of the DA's 36-38. The storage device 30 also includes a global memory 46 that may be accessed by the HA's 32-34 and the DA's 36-38. The storage device 30 also includes an RDF adapter (RA) 48 that may also access the global memory 46. The RA 48 may communicate with one or more additional remote storage devices (not shown) and/or one or more other remote devices (not shown) via a data link 52. The HA's 32-34, the DA's 36-38, the global memory 46 and the RA 48 are coupled to a bus 54 that is provided to facilitate communication therebetween.

Each of the HA's 32-34 may be coupled to one or more host computers (not shown) that access the storage device 30. The host computers (hosts) read data stored on the disk drives 42-44 and write data to the disk drives 42-44. The global memory 46 contains a cache memory that holds tracks of data from the disk drives 42-44 as well as storage for tables that may be accessed by the HA's 32-34, the DA's 36-38 and the RA 48. Note that, for the discussion herein, blocks of data are described as being a track or tracks of data. However, it will be appreciated by one of ordinary skill in the art, that the system described herein may work with any appropriate incremental amount, or section, of data, including possibly variable incremental amounts of data and/or fixed incremental amounts of data.

Figure 2:
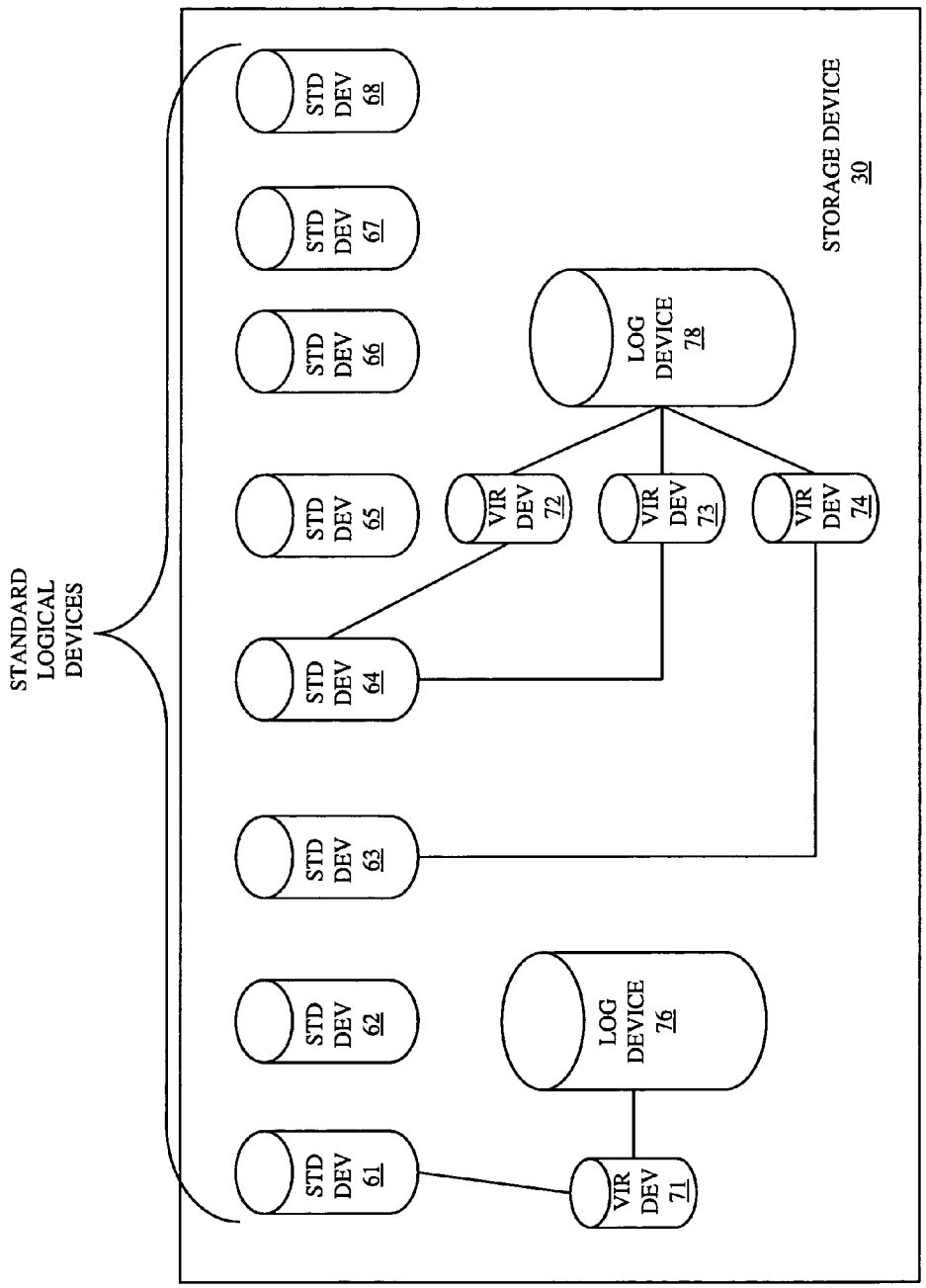
FIG. 2 is a diagram of a storage that shows various logical volumes that are used in connection with the system described herein.

Referring to FIG. 2, the storage device 30 is shown as including a plurality of standard logical devices 61-68. Each of the standard logical devices 61-68 may correspond to a volume that is accessible to one or more hosts coupled to the storage device 30. Each of the standard logical devices 61-68 may or may not correspond to one of the disk drives 42-44. Thus, for example, the standard logical device 61 may correspond to the disk drive 42, may correspond to a portion of the disk drive 42, or may correspond to a portion of the disk drive 42 and a portion of the disk drive 43. Each of the standard logical devices 61-68 appears to the host as a contiguous block of disk storage, even though each of the standard logical devices 61-68 may or may not correspond to actual contiguous physical storage of the disk drives 42-44.

The storage device 30 may also includes a plurality of virtual devices 71-74. The virtual devices 71-74 appear to a host coupled to the storage device 30 as volumes containing a contiguous block of data storage. Each of the virtual devices 71-74 may represent a point in time copy of an entire one of the standard logical devices 61-68, a portion of one of the standard logical devices 61-68, or a combination of portions or entire ones of the standard logical devices 61-68. However, as described in more detail elsewhere herein, the virtual devices 71-74 do not contain the track data from the standard logical devices 61-68. Instead, each of the virtual devices 71-74 is coupled to a log device 76 or a log device 78 that stores some or all the track data, as described in more detail elsewhere herein. The virtual devices 71-74 contain tables that point to tracks of data on either on the standard logical devices 61-68 or the log devices 76, 78.

The virtual device 71 may represent a point in time copy of the standard logical device 61. As described in more detail elsewhere herein, the virtual device 71 is coupled to the log device 76 that contains track data to facilitate the virtual device 71 appearing to a host to be a point in time copy of the standard logical device 61. It is possible for more than one virtual device to use a single log device. Thus, the virtual devices 72-74 are shown being coupled to the log device 78. Similarly, it is possible for more than one virtual device to represent point in time copies of a single standard logical device. Thus, the virtual devices 72,73 are shown as being point in time copies of the standard logical device 64. The virtual devices 72,73 may represent the same point in time copy of the standard logical device 64 or, alternatively, may represent point in time copies of the standard logical device 64 taken at different times. Note that only some of the standard logical devices 61-68 are shown as being associated with a corresponding one of the virtual devices 71-74 while others of the standard logical devices 61-68 are not.

In some embodiments, it may be possible to implement the system described herein using storage areas, instead of storage devices. Thus, for example, the virtual devices 71-74 may be virtual storage areas, the standard logical devices 61-68 may be standard logical areas, and the log devices 76,78 may be log areas. In some instances, such an implementation may allow for hybrid logical/virtual devices where a single logical device has portions that behave as a standard logical device, portions that behave as a virtual device, and/or portions that behave as log device. Accordingly, it should be understood that, in appropriate instances, references to devices in the discussion herein may also apply to storage areas that may or may not correspond directly with a storage device.

Figure 3:
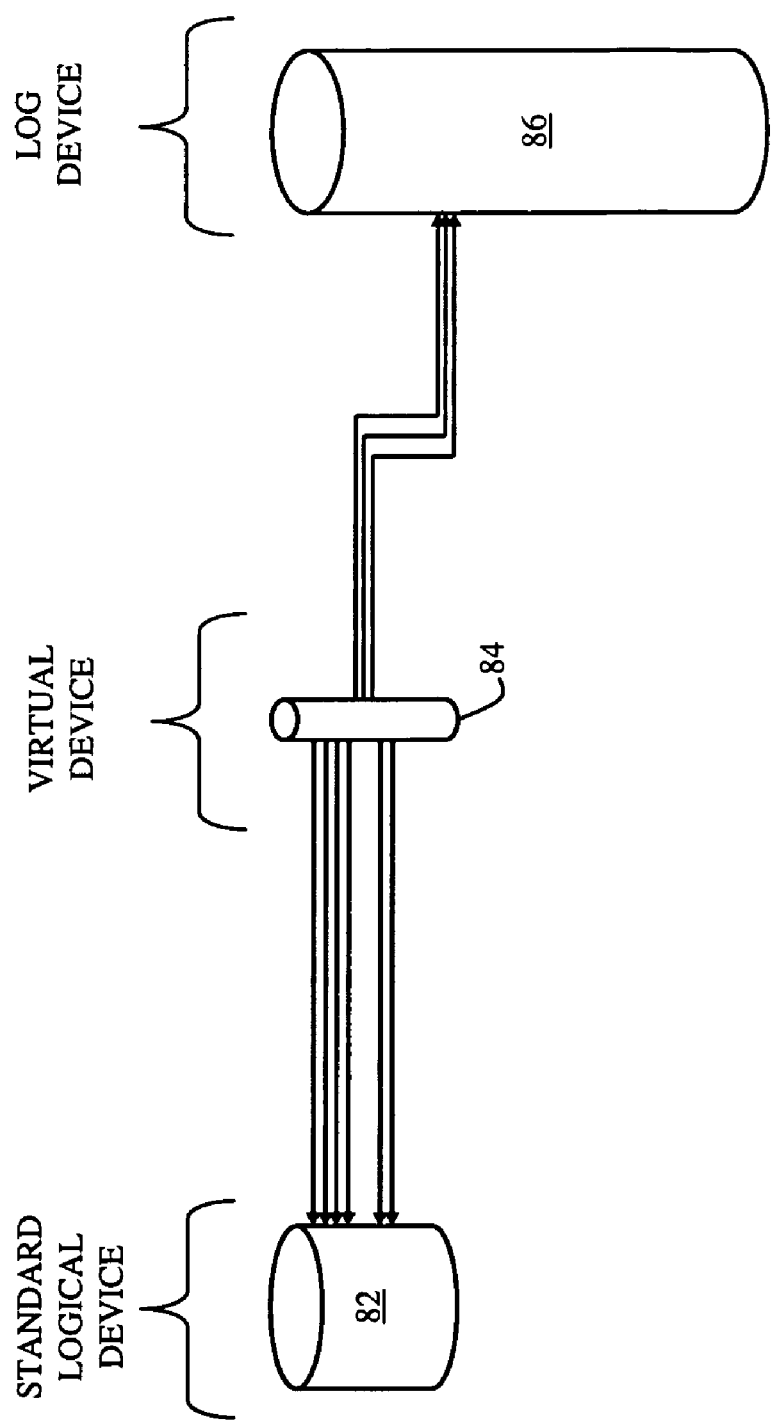
FIG. 3 is a diagram showing use of a virtual device according to the system described herein.

Referring to FIG. 3, a diagram shows a standard logical device 82, a virtual device 84, and a log device 86. As discussed above, the virtual device 84 may represent a point in time copy of all or a portion of the standard logical device 82. A host coupled to a storage device that accesses the virtual device 84 may access the virtual device 84 in the same way that the host would access the standard logical device 82. However, the virtual device 84 does not contain any track data from the standard logical device 82. Instead, the virtual device 84 includes a plurality of table entries that point to tracks on either the standard logical device 82 or the log device 86.

When the virtual device is established 84 (e.g., when a point in time copy is made of the standard logical device 82), the virtual device 84 is created and provided with appropriate table entries that, at the time of establishment, point to tracks of the standard logical device 82. A host accessing the virtual device 84 to read a track would read the appropriate track from the standard logical device 82 based on the table entry of the virtual device 84 pointing to the track of the standard logical device 82.

After the virtual device 84 has been established, it is possible for a host to write data to the standard logical device 82. In that case, the previous data that was stored on the standard logical device 82 is copied to the log device 86 and the table entries of the virtual device 84 that previously pointed to tracks of the standard logical device 82 would be modified to point to the new tracks of the log device 86 to which the data had been copied. Thus, a host accessing the virtual device 84 would read either tracks from the standard logical device 82 that have not changed since the virtual device 84 was established or, alternatively, would read corresponding tracks from the log device 86 that contain data copied from the standard logical device 82 after the virtual device 84 was established. Adjusting data and pointers in connection with reads and writes to and from the standard logical device 82 and virtual device 84 is discussed in more detail elsewhere herein.

In an embodiment described herein, hosts would not have direct access to the log device 86. That is, the log device 86 would be used exclusively in connection with the virtual device 84 (and possibly other virtual devices as described in more detail elsewhere herein). In addition, for an embodiment described herein, the standard logical device 82, the virtual device 84, and the log device 86 may be provided on the single storage device 30. However, it is possible to provide the different logical devices and the log device on separate storage devices interconnected using, for example, the RDF protocol or other remote communication protocols. In addition, it may be possible to have portions of one or more of the standard logical device 82, the virtual device 84, and/or the log device 86 provided on separate storage devices that are appropriately interconnected.

Figure 4:
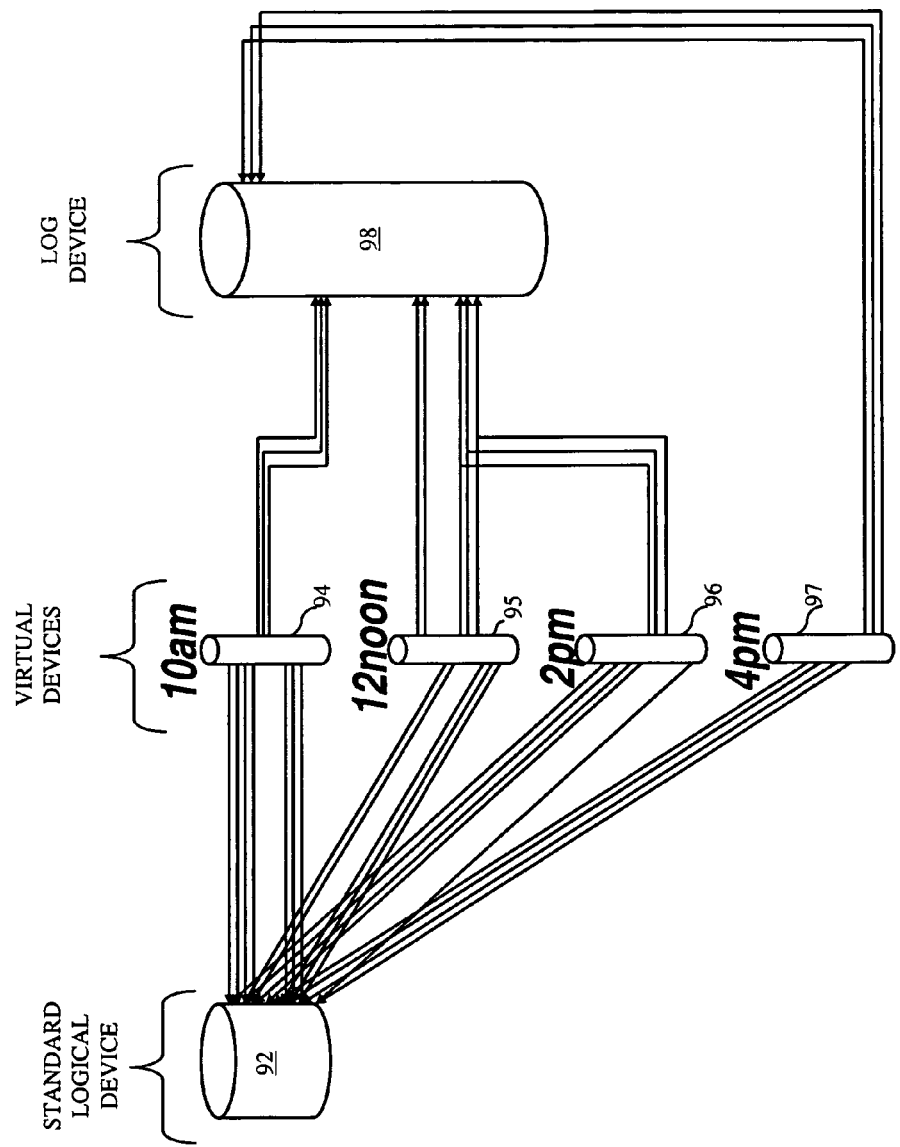
FIG. 4 is a diagram showing use of a plurality of virtual devices according to the system described herein.

Referring to FIG. 4, another example of the use of virtual devices shows a standard logical device 92, a plurality of virtual devices 94-97 and a log device 98. In the example of FIG. 4, the virtual device 94 represents a point in time copy of the standard logical device 92 taken at ten a.m. Similarly, the virtual device 95 represents a copy of the standard logical device 92 taken at twelve noon, the virtual device 96 represents a copy of the standard logical device 92 taken at two p.m., and the virtual device 97 represents a copy of the standard logical device 92 taken at four p.m. Note that all of the virtual devices 94-97 may share the log device 98. In addition, it is possible for table entries of more than one of the virtual devices 94-97, or, a subset of the table entries of the virtual devices 94-97, to point to the same tracks of the log device 98. For example, the virtual device 95 and the virtual device 96 are shown as having table entries that point to the same tracks of the log device 98.

In an embodiment discussed herein, the log device 98 and other log devices discussed herein are provided by a pool of log devices that is managed by the storage device 30. In that case, as a virtual device requires additional tracks of a log device, the virtual device would cause more log device storage to be created (in the form of more tracks for an existing log device or a new log device) using the log device pool mechanism. Pooling storage device resources in this manner is known in the art. Other techniques that do not use pooling may be used to provide log device storage.

Figure 5:
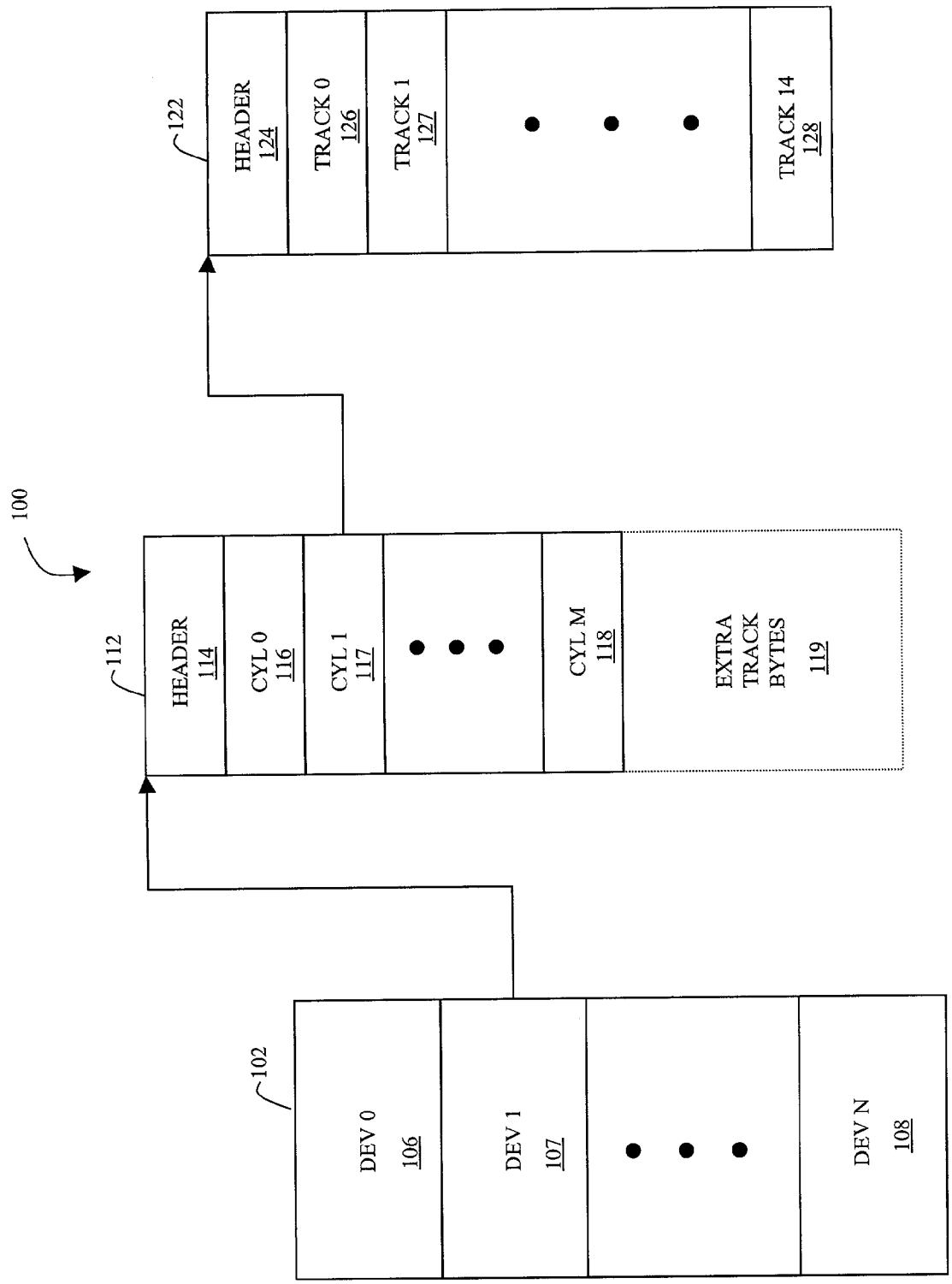
FIG. 5 is a diagram showing device tables used in connection with the system described herein.

Referring to FIG. 5, a diagram 100 illustrates tables that are used to keep track of device information. A first table 102 corresponds to all of the devices used by a storage device or by an element of a storage device, such as an HA and/or a DA. The table 102 includes a plurality of logical device entries 106-108 that correspond to all the logical devices used by the storage device (or portion of the storage device). The entries in the table 102 include descriptions for standard logical devices, virtual devices, log devices, and other types of logical devices.

Each of the entries 106-108 of the table 102 correspond to another table that contains information for each of the logical devices. For example, the entry 107 may correspond to a table 112. The table 112 includes a header that contains overhead information. The table 112 also includes entries 116-118 for each of the cylinders of the logical device. In an embodiment disclosed herein, a logical device may contain any number of cylinders depending upon how the logical device is initialized. However, in other embodiments, a logical device may contain a fixed number of cylinders.

The table 112 is shown as including a section for extra track bytes 119. The extra track bytes 119 are used in connection with the log devices in a manner that is discussed elsewhere herein. In an embodiment disclosed herein, there are eight extra track bytes for each track of a log device. For devices that are not log devices, the extra track bytes 119 may not be used.

Each of the cylinder entries 116-118 corresponds to a track table. For example, the entry 117 may correspond to a track table 122 that includes a header 124 having overhead information. The track table 122 also includes entries 126-128 for each of the tracks. In an embodiment disclosed herein, there are fifteen tracks for every cylinder. However, for other embodiments, it may be possible to have different numbers of tracks for each of the cylinders or even a variable number of tracks for each cylinder. For standard logical devices and log devices, the information in each of the entries 126-128 includes a pointer (either direct or indirect) to the physical address on one of the disk drives 42-44 of the storage device 30 (or a remote storage device if the system is so configured). Thus, the track table 122 may be used to map logical addresses of the logical device corresponding to the tables 102, 112, 122 to physical addresses on the disk drives 42-44 of the storage device 30. For virtual devices, each of the entries 126-128 of the table 122 points to a track of a corresponding standard logical device or corresponding log device. For other embodiments, however, it may be possible to use a different mechanism where the tables 102, 122, 122 are used only for standard logical devices that contain tracks of data while another type of table, such as a simple array of tracks, is used by virtual devices to map tracks of the virtual devices to tracks of corresponding standard logical devices or log devices.

Each track of a log device is either free, meaning that it is not being used by a virtual device, or is assigned, meaning that the track is pointed to by a table entry in one or more of the virtual devices. In an embodiment disclosed herein, the tracks of a log device are managed by first creating a doubly linked list of all of the free tracks of the log device. The pointers for the doubly linked list are provided by the extra track bytes 119 of the table 112 so that the extra track bytes 119 for a log device contains eight bytes for every track of the log device. For every track of the log device that is free, the extra eight bytes include a forward pointer pointing to the next free track of the log device and a backward pointer pointing to the previous free track of the log device. Using a doubly linked list in this manner facilitates accessing free tracks of the log device.

In addition, if a track of a log device is assigned (i.e., is used by one or more virtual devices), the corresponding extra track bytes 119 for the track may be used to point back to the corresponding track of the standard logical device. Thus, when a write is performed to the standard logical device after the virtual device has been established, the data from the standard logical device is copied to a new track of the log device and the extra track bytes corresponding to the new track of the log device are made to point back to the track of the standard logical device from which the data came. Having each track of the log device point back to the corresponding track of the standard logical device is useful in, for example, data recovery situations.

In addition, for an embodiment disclosed herein, the pointers for the extra eight bytes per track for an assigned track are stored with the data also. That is, when a particular track of a log device is assigned, the pointer back to the corresponding track of a standard logical device is stored with the extra track bytes 119 and, in addition, the pointer is stored with the track data itself on the track of the log device. For CKD formatted tracks, the extra eight bytes may be stored in block zero. For FBA formatted tracks, the extra eight bytes may be stored in an additional block appended on the end of the track. In an embodiment disclosed herein, a block is five hundred and twelve bytes and an FBA track contains forty blocks, which is increased to forty one when an additional block is appended. Different track formats are disclosed, for example, in U.S. Pat. No. 5,206,939 to Yanai, et al., which is incorporated herein by reference.

The tables 102, 112, 122 of FIG. 5 may be stored in the global memory 46 of the storage device 30. In addition, the tables corresponding to devices accessed by a particular host may be stored in local memory of the corresponding one of the HA's 32-36. In addition, the RA 48 and/or the DA's 36-38 may also use and locally store portions of the tables 102, 112, 122.

Figure 6:
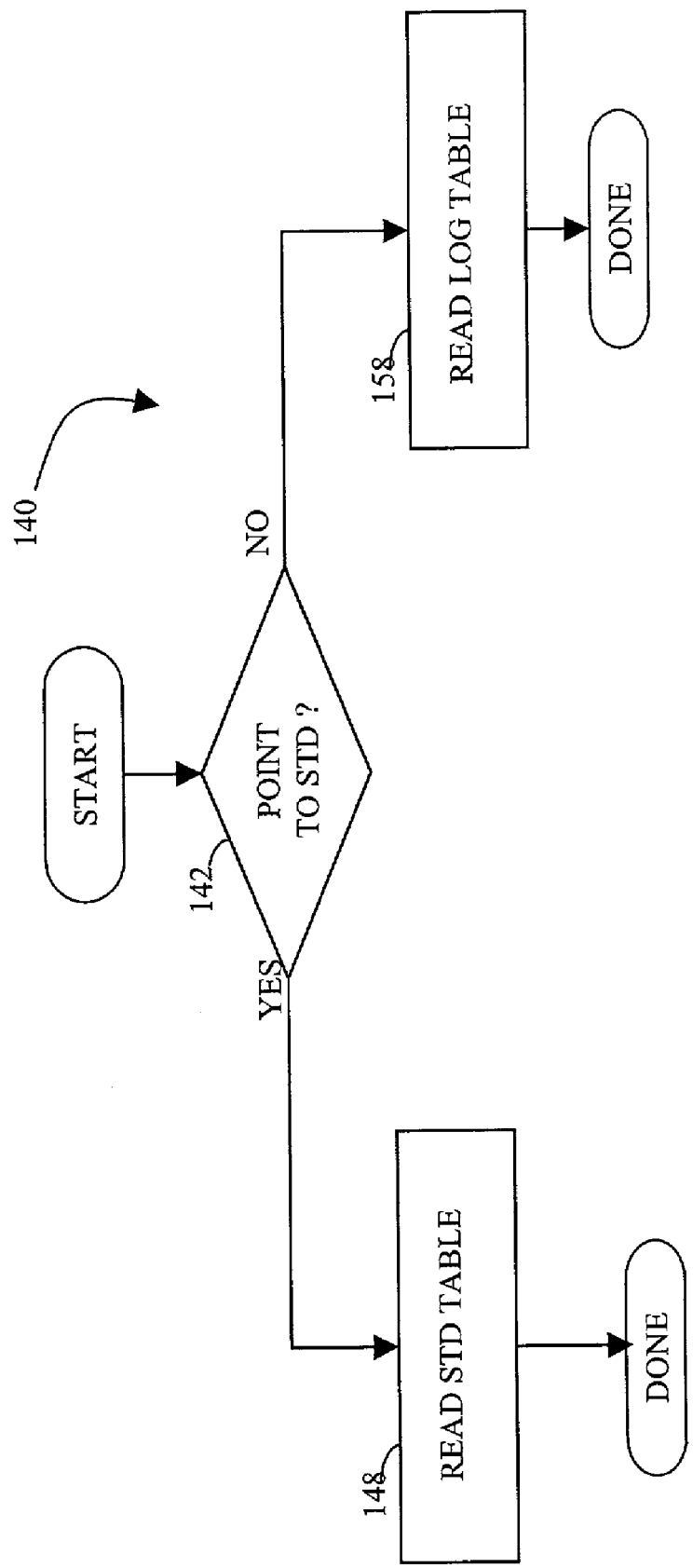
FIG. 6 is a flow chart illustrating reading a table used in connection with a virtual device according to the system described herein.

Referring to FIG. 6, a flow chart 140 illustrates steps performed when a host reads data from a device table corresponding to a track that is accessible through a virtual device. That is, the flow chart 140 illustrates obtaining information about a track that is pointed to by a table entry for a virtual device.

Processing begins at a test step 142 where it is determined if the track of interest (i.e., the track corresponding to the table entry being read) is on the standard logical device or the log device. This is determined by accessing the device table entry for the virtual device and determining whether the table entry for the track of interest points to either the standard logical device or the log device. If it is determined at the test step 142 that the pointer in the table for the virtual device points to the standard logical device, then control passes from the step 142 to a step 148 where the table entry of interest is read. Following the step 148, processing is complete.

If it is determined that the test step 142 that the pointer in the device table for the virtual device for the track of interest points to the log device, then control transfers from the step 142 to a step 158 where the log table entry of interest is read. Following the step 158, processing is complete.

Note that, in some instances, access to data may be controlled by a flag or lock that prohibits multiple processes having access to the data simultaneously. This is especially useful in instances where a device table is being read or modified. The system disclosed herein contemplates any one of a variety of mechanisms for controlling access to data by multiple processes, including conventional combinations of software and/or hardware locks, also known as "flags" or "semaphores". In some instances, a process accessing data may need to wait until another process releases the data. In one embodiment, a hardware lock controls access to a software lock (flag) so that a process first obtains control of the hardware lock, tests the software lock, and then, if the software lock is clear, the process sets the software lock and then releases the hardware lock. If the process gets the hardware lock and determines that the software lock is not clear, then the process releases the hardware lock so that another process that has set the software lock can clear the software lock at a later time. Further note that, in some instances, it is useful to first read a table entry corresponding to a particular track, read the track into a cache slot (if the track is not already in cache), lock the cache slot, and then reread the corresponding table entry.

Figure 7:
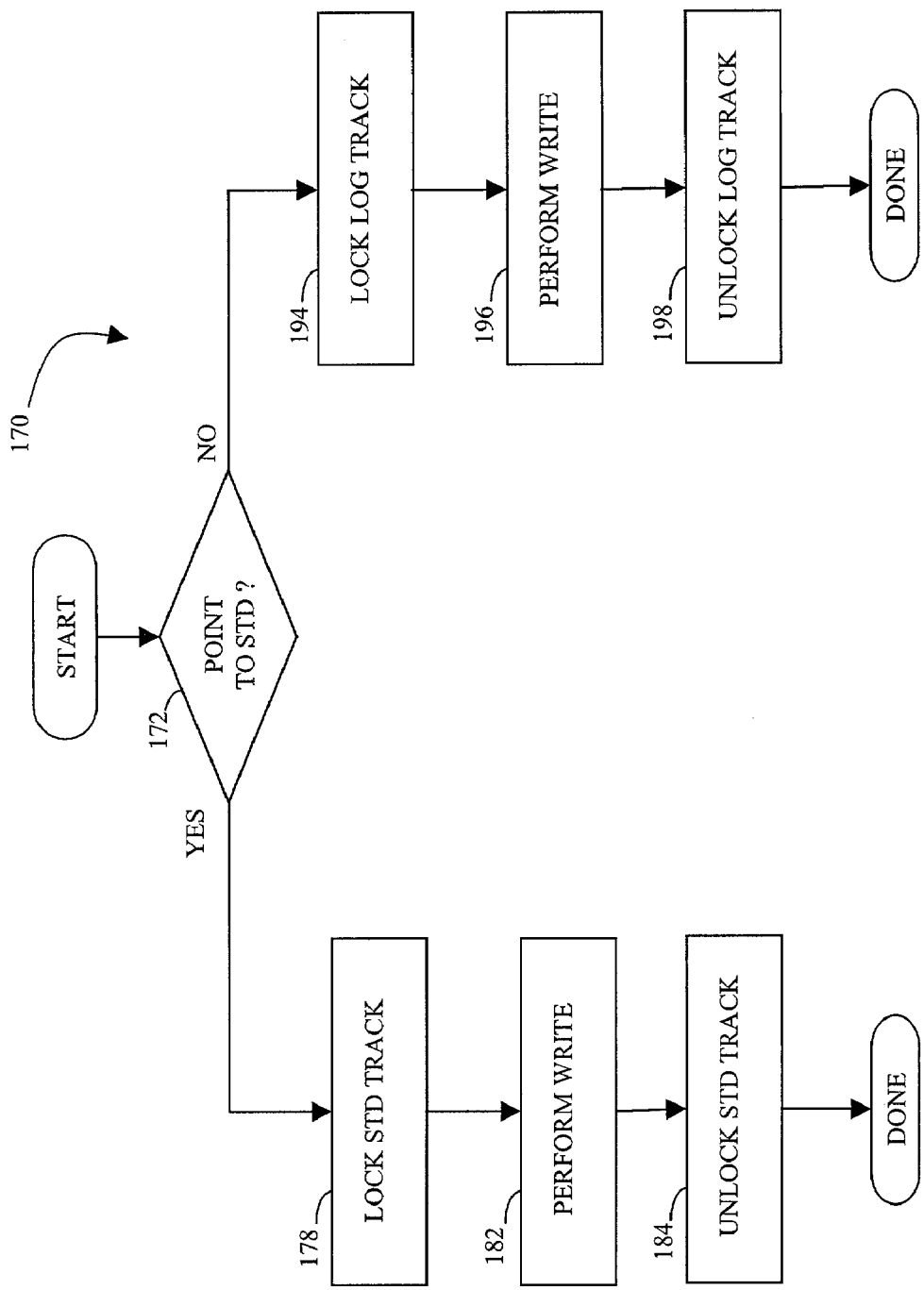
FIG. 7 is a flow chart illustrating writing to a table used in connection with a virtual device according to the system described herein.

Referring to FIG. 7, a flow chart 170 illustrates steps performed in connection with writing information to a device table for a virtual device corresponding to a standard logical device or a log device. Processing begins at a first step 172 where it is determined if the particular track corresponding to the device table entry being written is on the standard logical device or the log device. If it is determined the particular track of interest is on the standard logical device, control passes from the step 172 to a step 178 where the track corresponding to the device table entry being written is locked. Locking the track at the step 178 prevents other processes from getting access to the track, and from modifying the corresponding table entry, while the current process is modifying the device table entry corresponding to the track. Following the step 178 is a step 182 where the write operation is performed. Following the step 182 is a step 184 where the track is unlocked. Following the step 184, processing is complete.

If it is determined that the test step 172 that the track corresponding to the table entry for the virtual device that is being modified points to the log device, then control passes from the test step 172 to a step 194 where the track of the log device corresponding to the entry of the device table that is being written is locked. Following the step 194 is a step 196 where the write operation is performed. Following the step 196 is a step 198 where the track is unlocked. Following the step 198, processing is complete.

Figure 8:
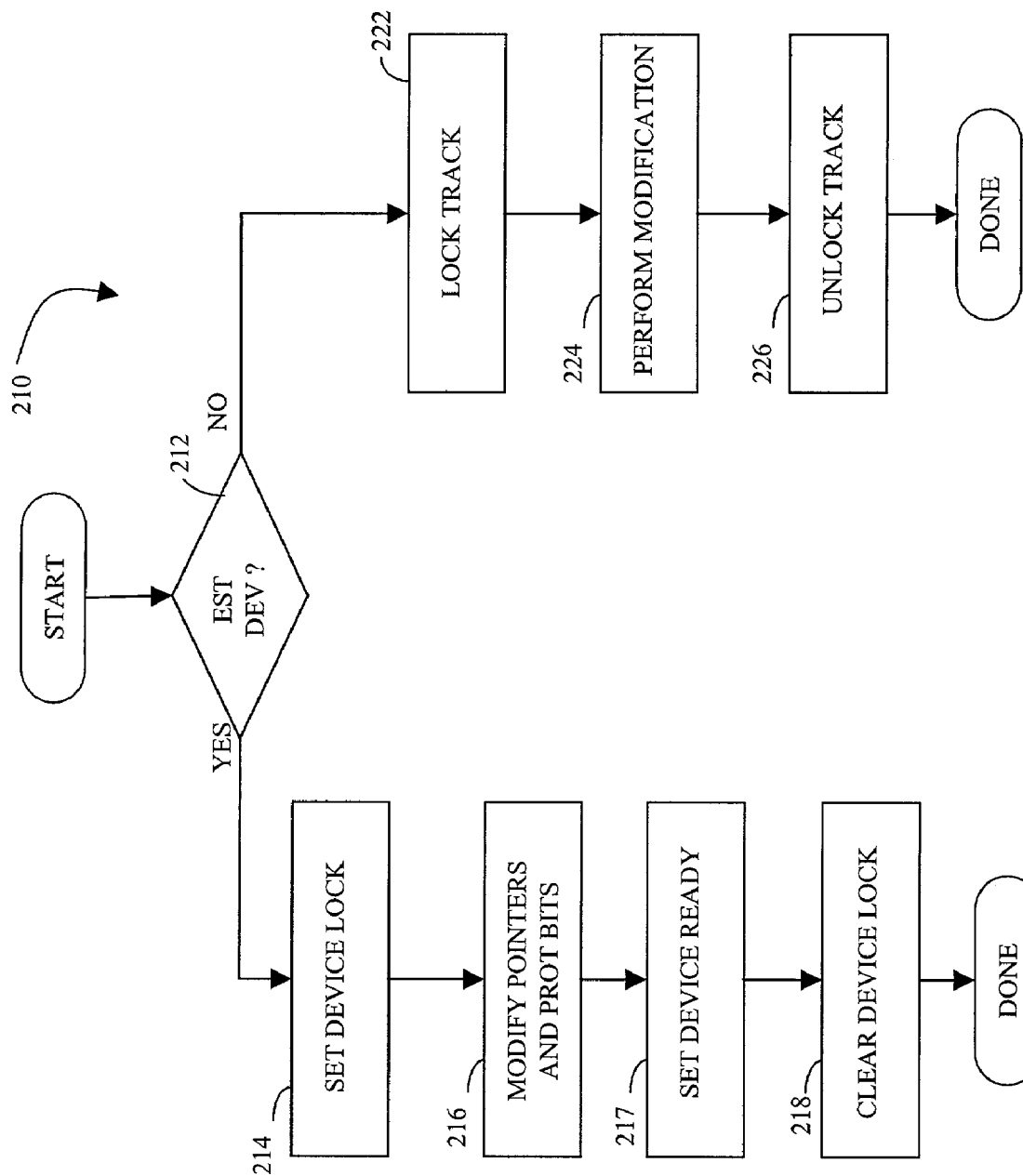
FIG. 8 is a flow chart illustrating modification of a virtual device table and establishing a virtual device according to the system described herein.

Referring to FIG. 8, a flow chart 210 illustrates steps performed in connection with modifying a device table corresponding to a virtual device. This may be contrasted with the flow chart 170 of FIG. 7 that illustrates modifying the device table for the standard logical device or the log device pointed to by an entry for a track of the device table for a virtual device. In flow chart 210, the device table for the virtual device is modified, as opposed to the device table for the standard logical device or the device table for the log device.

Processing begins at a first step 212 where it is determined if the modifications to the table relate to establishing the virtual device. As discussed elsewhere herein, establishing a virtual device includes making the virtual device available for access by a host after the virtual device is created. Establishing a virtual device causes the virtual device to be associated with a standard logical device (and thus, represent a point in time copy of the standard logical device at the time of establishment). Prior to being associated with a standard logical device, a virtual device is not established and is not accessible by a host. After being established, a virtual device is accessible by a host.

If it is determined at the step 212 that the modifications to the table relate to establishing the virtual device, then control passes from the step 212 to a step 214 where a device lock for the virtual device is set to prohibit access to the table by other processes. The device lock is comparable to the cache slot lock, discussed elsewhere herein.

Following the step 214 is a step 216 where the pointers of the virtual device table are made to point to tracks of the standard logical device and where a protection bit is set for each of the tracks of the standard logical device that corresponds to the virtual device being established. In an embodiment disclosed herein, each of the tracks of the standard logical device has sixteen bits which may be set as protection bits, one for each virtual device established to the standard logical device. In some embodiments, the protection bits may have uses that are unrelated to virtual devices. A new virtual device being established may be assigned a new bit position in the sixteen bit field while the bit for each track of the standard logical device may be set. As discussed in more detail elsewhere herein, the protection bit being set followed by a subsequent write to the standard logical device indicates that special processing needs to take place to accommodate the virtual device established to the standard logical device. The special processing is described in more detail elsewhere herein. Also at the step 216, the track entries for the device table for the virtual device are all modified to point to the corresponding tracks of the standard logical device. Thus, when the virtual device is first established, all of the pointers of the device table of the virtual device point to the tracks of the standard logical device.

Following the step 216 is a step 217 the virtual device is set to the ready state, thus making the virtual device accessible to hosts. Following the step 217 is a step 218 where the virtual device is unlocked, thus allowing access by other processes. Following the step 218, processing is complete.

If it is determined that the test step 212 that the virtual device is not being established (i.e., some other operation is being performed), then control passes from the test step 212 to a step 222 to lock a track corresponding to the entry of the device table for the virtual device that is being modified. Note that the track that is locked at the step 222 may either be a track on the standard logical device (if the entry of interest in the device table of the virtual device points to the standard logical device) or a track of the log device (if the entry of interest points to the log device). Following the step 222 is a step 224 where the modification to the device table for the virtual device is performed. Following the step 224 is a step 226 where the track is unlocked. Following the step 226, processing is complete.

Figure 9:
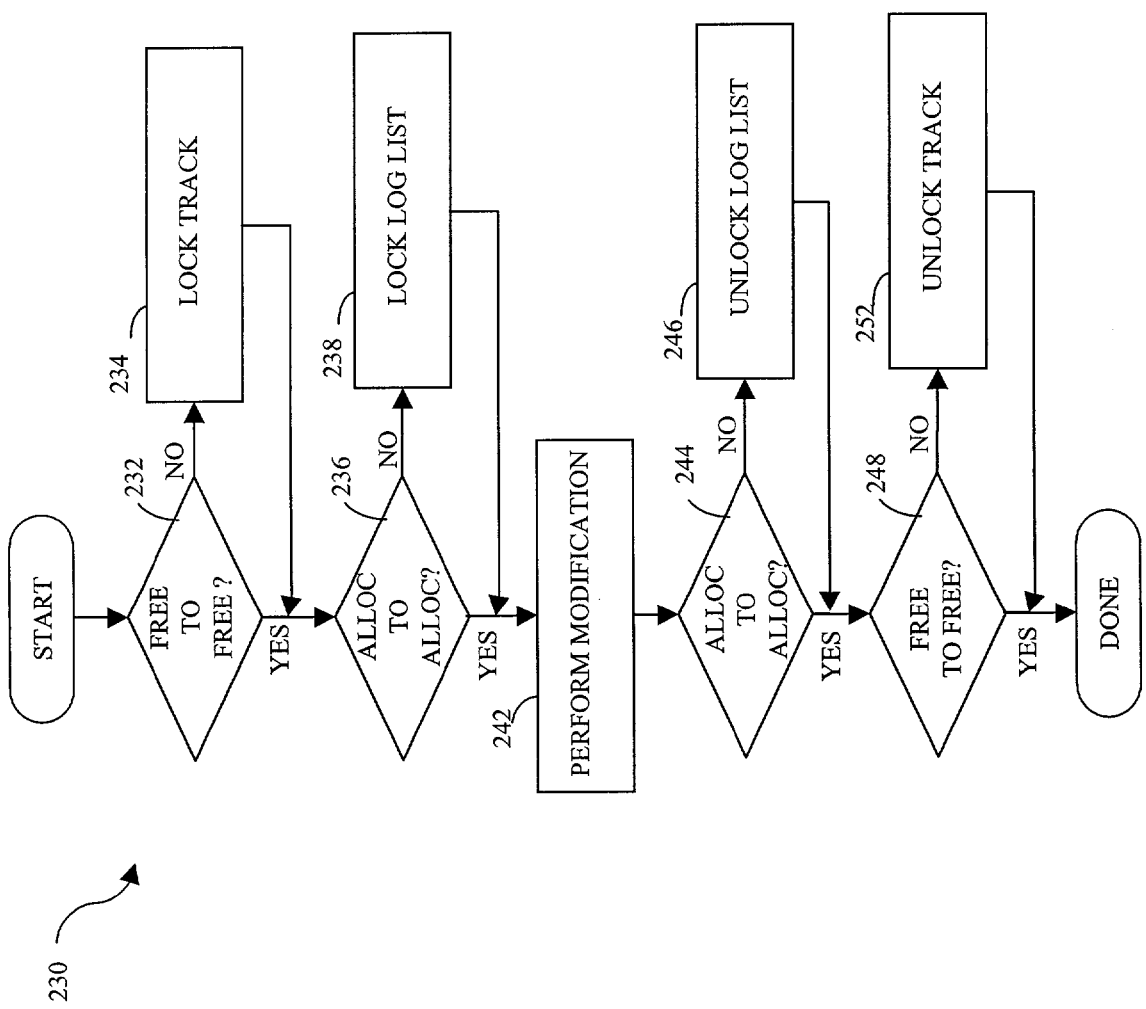
FIG. 9 is a flow chart illustrating modification of data structures used to handle tracks of a log device according to the system described herein.

Referring to FIG. 9, a flow chart 230 illustrates steps performed in connection with manipulating tracks of a log device. As discussed above, the tracks of a log device are maintained by creating a doubly linked list of tracks of the log device that are free (i.e. tracks that are available for accepting new data). Thus, if one or more tracks are needed for use in connection with a corresponding virtual device, the free tracks are obtained from the doubly linked list, which is modified in a conventional manner to indicate that the tracks provided for use by the virtual device are no longer free. Conversely, if one or more tracks that are used by one or more virtual devices are no longer needed, the tracks are returned to the doubly linked list, in a conventional manner, in order to indicate that the tracks are free. The flow chart 230 of FIG. 9 illustrates the steps performed in connection with controlling access to the tracks (and track pointers) by multiple processes which manipulate the tracks.

Processing begins at a test step 232 where it is determined if the operation being performed is modifying only tracks that are on the free list. Note that modifying tracks only on the free lists by, for example, transferring a free track from one part of the list to another part or from one free lists to another free list (in the case of multiple free lists), does not involve modifications for tracks corresponding to any data. If it is determined at the test step 232 that the modification being performed does not involve only tracks on the free list, then control transfers from the step 232 to a step 234 where the track is locked to prevent access by other processes.

Following the step 234 or the step 232 if the step 234 is not reached is a test step 236 where it is determined if the manipulation involves only allocated tracks. For any operation involving only allocated tracks, it is not necessary to lock the log device list of free tracks. If it determined at the step 236 that the operation being performed is not manipulating only allocated tracks, then control transfers from the step 236 to the step 238 where the log device list of free tracks is locked to prevent access by other processes. Following the step 238, or following the step 236 if the step 238 is not executed, is a step 242 where the modification is performed.

Following the step 242 is a test step 244 where it is determined if the manipulation involves only allocated tracks. If it is determined at the test step 244 that the modification being performed does not involve only allocated tracks, then control transfers from the step 244 to a step 246 where the log device free list is unlocked. Following the step 246 or the step 244 if the step 246 is not reached is a test step 248 where it is determined if the operation being performed is modifying only tracks that are on the free list. If it determined at the step 248 that the operation being performed is modifying only tracks that are on the free list, then control transfers from the step 248 to the step 252 where the track or tracks locked at the step 234 are unlocked. Following the step 252, or following the step 248 if the step 252 is not executed, processing is complete.

Figure 10:
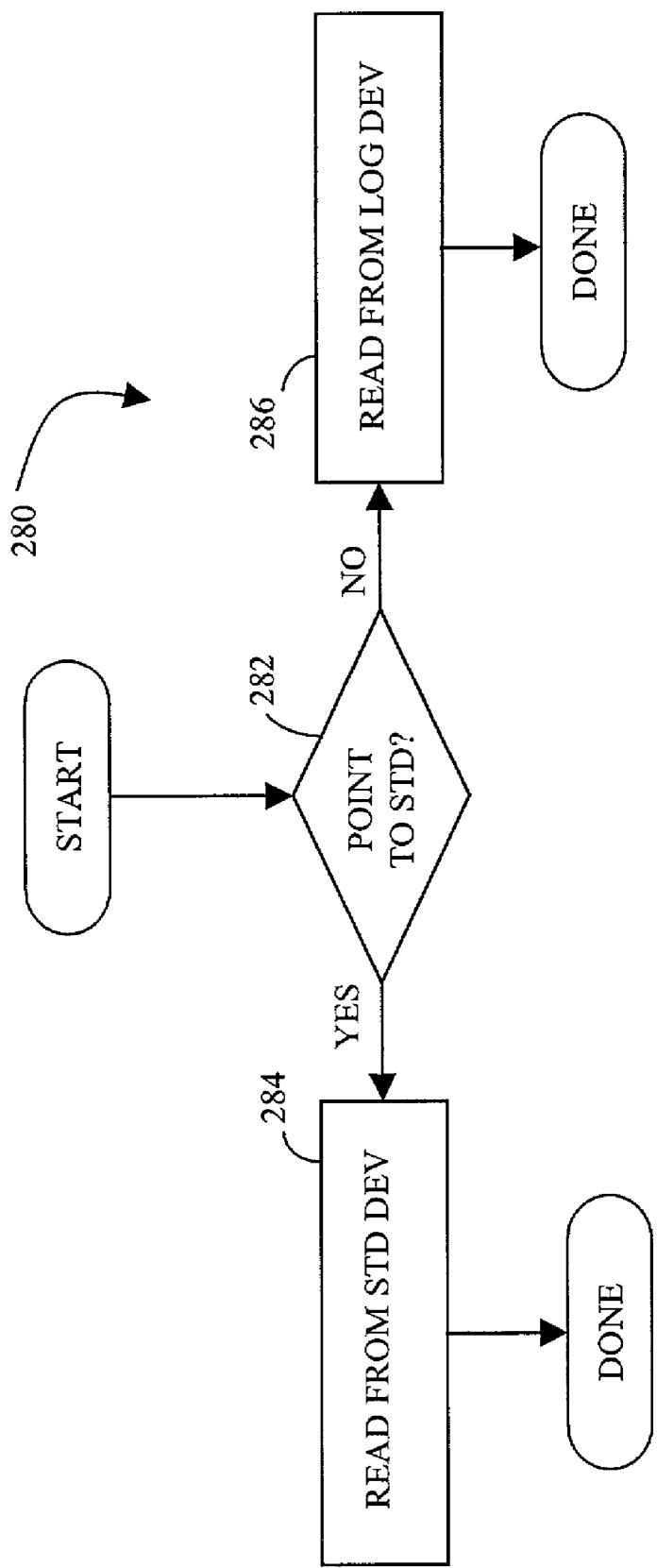
FIG. 10 is a flow chart illustrating steps performed in connection with reading a virtual device according to the system described herein.

Referring to FIG. 10, a flow chart 280 illustrates steps performed in connection with reading data from a virtual device. Processing begins at a test step 282, where it is determined if the device table entry for the track of interest of the virtual device points to the standard logical device or points to the log device. If it is determined at the test step 282 that the table points to the standard logical device, then control passes from the step 282 to a step 284, where the track is read from the standard logical device. Following the step 284, processing is complete. Alternatively, if it determined at the test step 282 that the device table of the virtual device points to the log device, then control passes from the step 282 to a step 286, where the track of interest is read from the log device. Following the step 286, processing is complete.

Note that in some instances, it may be possible that prior to the test step 282, it is determined that the track of interest being read is already in the cache memory (global memory). In that case, the track may be obtained from the cache memory without executing any of the steps 282, 284, 286.

Figure 11:
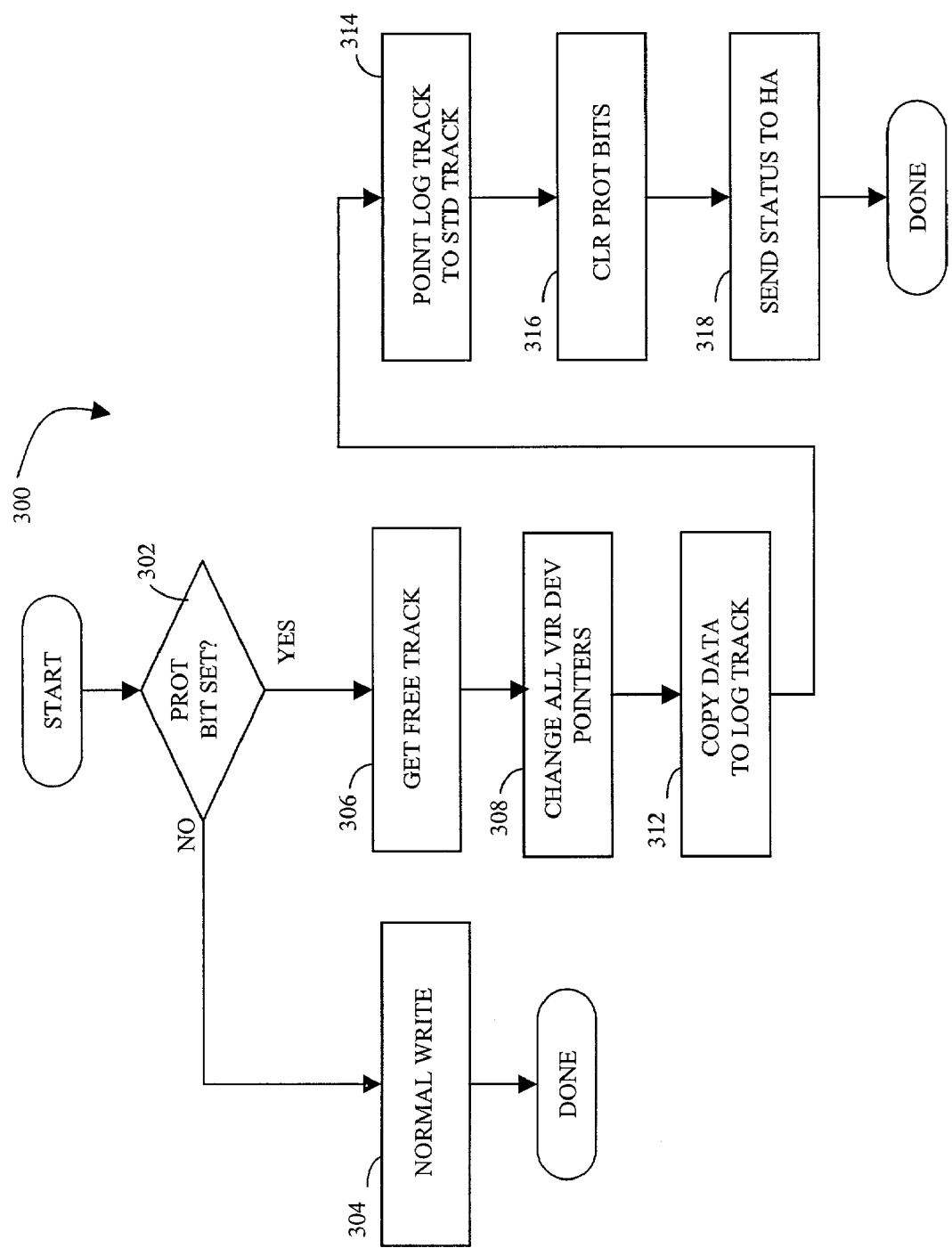
FIG. 11 is a flow chart illustrating steps performed by a disk adapter in connection with writing to a standard logical device to which a virtual device has been established according to the system described herein.

Referring to FIG. 11, a flow chart 300 illustrates steps performed by a DA in connection with writing to a track of a standard logical device to which a virtual device has been previously established. Processing begins at a first step 302 where it is determined if any protection bits for the track being written on the standard logical device have been set. If it determined at the test step 302 that the protection bits are not set, then control transfers from the step 302 to a step 304, where a normal write operation is performed. That is, at the step 304, data is written to the standard logical device in a conventional fashion without regard to the existence of a virtual device that had been previously established to the standard logical device. Following the step 304, processing is complete.

If it is determined at the test step 302 that one or more protection bits have been set on the track of the standard logical device that is being written, control passes from the step 302 to a step 306, where a free track of the log device is obtained. The free track of the log device is needed to copy data from the track of the standard logical device. Also, as described in more detail elsewhere herein, free tracks of the log device may be managed using a doubly-linked list of the free tracks. Thus, at the step 306, it may be possible to obtain a free track by traversing the list of free tracks of the log device and modifying the pointers appropriately to remove one of the free tracks for use.

Following the step 306 is a step 308, where, for each virtual device that corresponds to a protection bit that was determined to be set at the test step 302, the pointers of the virtual devices, which initially pointed to the track being written on the standard logical device, are modified at the step 308 to point to the free track of the log device obtained at the step 306. As discussed above, it is possible to have more than one virtual device established to a standard logical device. For each virtual device that has been established to a particular standard logical device, a specific protection bit will be set for each of the tracks of the standard logical device. Thus, at the step 308, the track pointers are changed for all the virtual devices corresponding to a set protection bit detected at the step 302. The track pointers in the device tables of virtual devices are modified to point to the new track that was obtained at the step 306.

Following the step 308 is a step 312, where the data is caused to be copied from the standard logical device to the new track on the log device that was obtained at the step 306. In an embodiment disclosed herein, the data may be copied by moving the data from disk storage to the global memory of the storage device (e.g., into a cache slot), and then setting a write pending indicator to cause the data to be copied to the track of the log device obtained at the step 306. The step 312 represents copying the data from the track of the standard logical device that is being written to the new track of the log device obtained at the step 306. Since all the pointers are modified at the step 308, any virtual device that has been established to the standard logical device prior to the track being written now points to the old data (i.e., the data as it existed on the track of the standard device when the virtual devices were established). Note also that, in connection with copying the track, the protection bits of the standard logical device track are copied to virtual device map bits for the track on the log device, which is explained in more detail elsewhere herein.

Following the step 312 is a step 314, where the track of the log device obtained at the step 306 is modified so that the extra bytes in the table (discussed elsewhere herein) are made to point back to the track of the standard logical device that is being written. Having the track of the log device point to the corresponding track of the standard logical device from which the data was provided is useful in many instances. For example, it may be useful in connection with data recovery. Following the step 314 is a step 316, where the protection bits of the tracks of the standard logical device being written are cleared. Following the step 316 is a step 318, where status is sent to the HA. Following the step 318, processing is complete.

Note that once the HA receives status, the HA may perform a normal write operation and, in that case, at the test step 302, the protection bits will not be set, since the bits are cleared at the step 316. The HA that is performing the write operation sees the protection bits that are set at the step 302 and sends a protection request to the appropriate DA. The HA then may disconnect from the DA and wait for status to arrive from the DA indicating that a normal write may be performed. While the HA is disconnected and waiting for status from the DA, the DA may perform the steps disclosed in the flow chart 300. This is described in more detail below.

Figure 12:
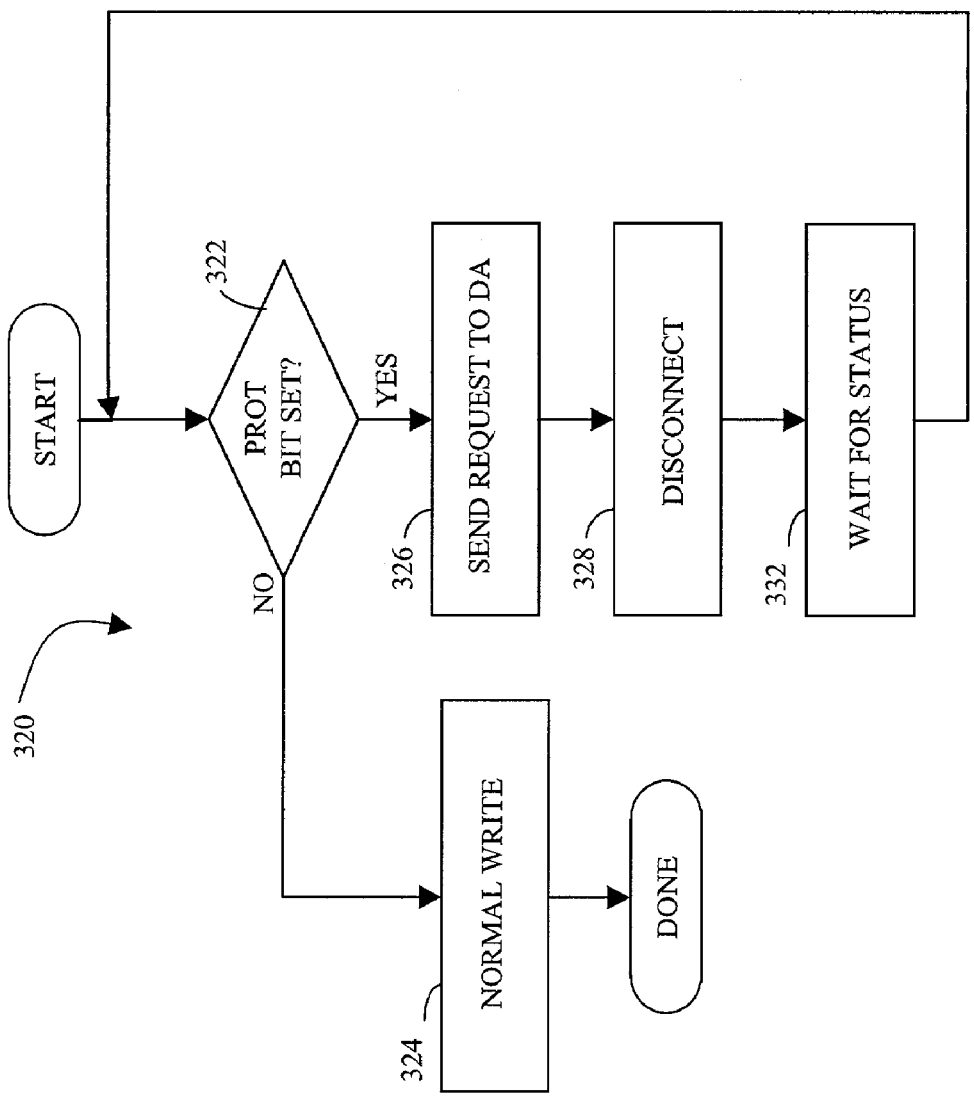
FIG. 12 is a flow chart illustrating steps performed by a host adapter in connection with writing to a standard logical

Referring to FIG. 12, a flow chart 320 illustrates steps performed by an HA in connection with a write to a standard logical device to which one or more virtual devices have been established. Processing begins at a first test step 322, where it is determined if any protection bits are set for the tracks of the standard logical device that are being written. If it is determined at the test step 322 that no protection bits are set, then control passes from the step 322 to a step 324, where a normal write is performed. Following the step 324, processing is complete.

If it is determined at the test step 322 that one or more protection bits are set for the tracks of the standard logical device that are being written, control passes from the step 322 to a step 326, where the HA sends a request to the DA indicating that protection bits are set for the tracks. When the DA receives the request that is sent at the step 326, the DA performs the operations set forth in the flow chart 300 of FIG. 11, discussed above. Following the step 326 is a step 328, where the HA disconnects from the DA in order to allow (possibly unrelated) operations to be performed with the DA by other processes and/or other HA's.

Following the step 328 is a step 332, where the HA waits for the DA to perform the operations set forth in the flow chart 300 of FIG. 11 and to send status to the HA indicating that the appropriate steps have been performed to handle the set protection bits. Following the step 332, processing transfers back to the step 322, where the protection bits for the track of the standard logical device are again tested. Note that on a second iteration, it is expected that the protection bits of the track of the standard logical device that are being written would be clear at the step 322, since the DA would have cleared the protection bits in connection with performing the steps of the flow chart 300. Of course, it is always possible that a new virtual device will be established to the standard logical device in between the DA clearing the protection bits and the step 322 being executed again. However, it is usually expected that the second iteration of the step 322 for a particular track of the standard logical device will determine that all the protection bits are clear, and control will transfer from the step 322 to the step 324 to perform a normal write.

Figure 13:
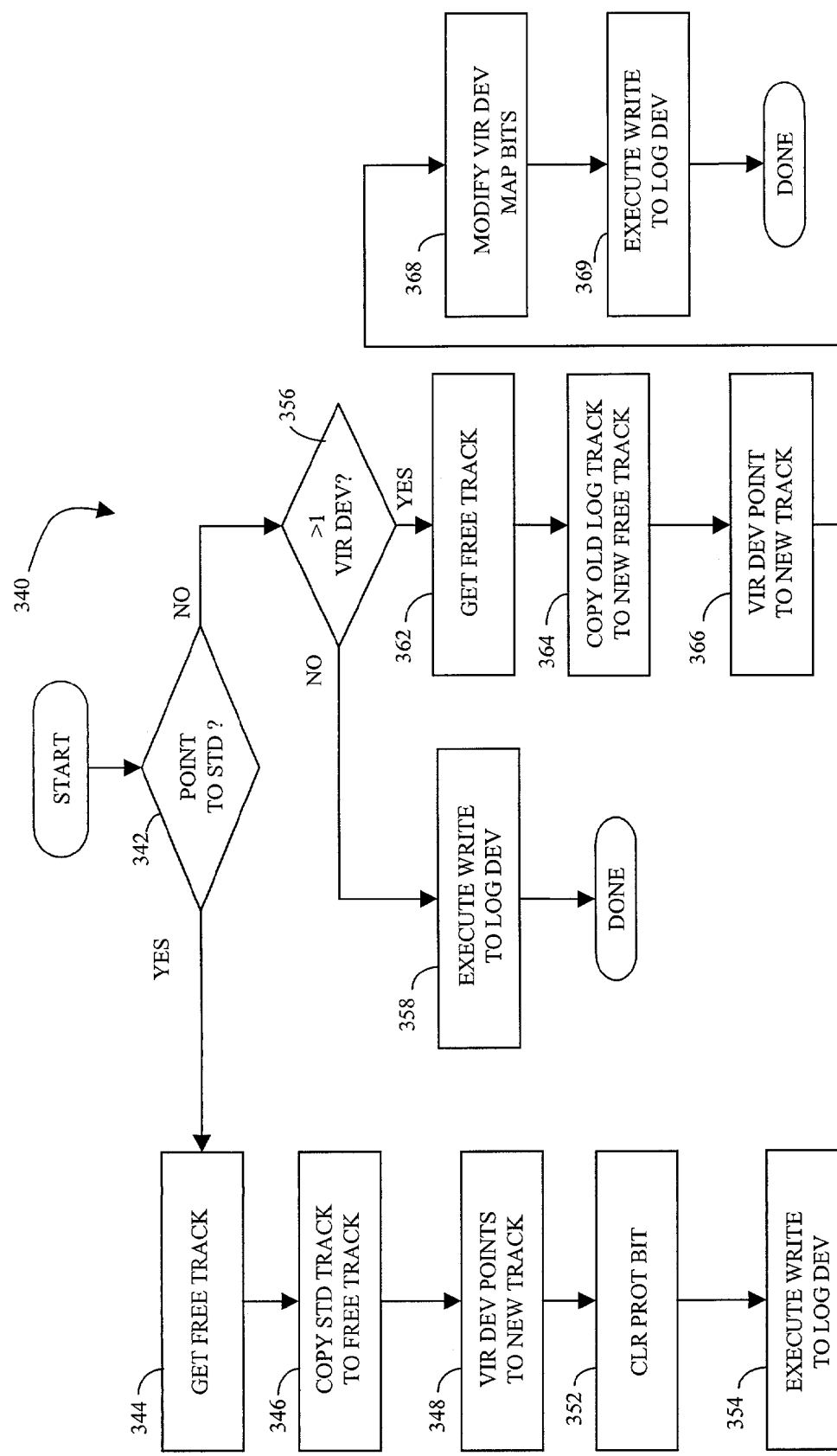
FIG. 13 is a flow chart illustrating steps performed in connection with writing to a virtual device according to the system described herein.

Referring to FIG. 13, a flow chart 340 illustrates steps performed in connection with writing to a virtual device. The flow chart 340 represents steps performed by both the HA and the DA and thus could have been provided as two flow charts, similar to the flow chart 300 of FIG. 11 and the flow chart 320 of FIG. 12. However, it will be understood by those of ordinary skill in the art that the flow chart 340 may represent a division of steps similar to those set forth in the flow charts 300, 320 and described in the corresponding portions of the text of the specification.

Processing begins at a first step 342, where it is determined if the virtual device points to the standard logical device. If so, then control transfers from the test step 342 to a step 344, where a free track of the log device is obtained. Following the step 344 is a step 346, where data from the standard logical device corresponding to the track being written is caused to be copied from the standard logical device to the track of the log device obtained at the step 344. Following the step 346 is a step 348, where the virtual device pointer for the track is adjusted to point to the track obtained at the step 344. Following the step 348 is a step 352, where a protection bit corresponding to the virtual device is cleared in the track data of the standard logical device, thus indicating that no special processing on behalf of the virtual device is required when writing to the track of the standard device. Following the step 352 is a step 354, where the write is executed. At the step 354, the data to be written may be a track or a portion of a track that is written to the track obtained at the step 344. Following the step 354, processing is complete. If the data corresponds to an entire track, then it may be possible to eliminate the step 346, which copies data from the track of the standard logical device to the new track of the log device, since writing an entire track's worth of data at the step 354 would overwrite all of the data copied at the step 346.

If it is determined at the test step 342 that the pointer for the track of the virtual devices being written does not point to the standard logical device, then control transfers from the step 342 to a test step 356, where it is determined if more than one virtual devices have been established to the standard logical device. If not, then control transfers from the step 356 to a step 358, where a normal write operation to the track of the log device is performed. If it is determined at the test step 356 that there is more than one virtual device established to the standard logical device, then control transfers from the step 356 to a step 362, where a free track from the log device is obtained.

Following the step 362 is a step 364, where the data of the track corresponding to the virtual device being written is copied to the track obtained at the step 362. Following the step 364 is a step 366, where the virtual device pointers are adjusted to point to the new track. In one embodiment, the pointer for the virtual device that is being written is made to point to the new track. Alternatively, it is possible to not change the pointer for the virtual device that is being written and, instead, adjust all the pointers for all of the other virtual devices that point to the track at the step 366.

Following the step 366 is a step 368 where the virtual device map bits for the tracks of the log device are modified. For the log device tracks, the virtual device map bits may be used to indicate which virtual devices point to each track, where, in one embodiment, there are sixteen virtual device map bits and each bit corresponds to a particular virtual device. Thus, the test at the step 356 may examine the virtual device map bits for the track.

Following the step 368 is a step 369, where the write is executed. Note that whether the write is executed to the track obtained at the step 362 or to the track that is initially pointed to by the virtual device being written depends upon how the pointers are adjusted at the step 366. In all cases, however, data is written to the track pointed to by the virtual device to which the data is being written. Following the step 369, processing is complete.

Figure 14:
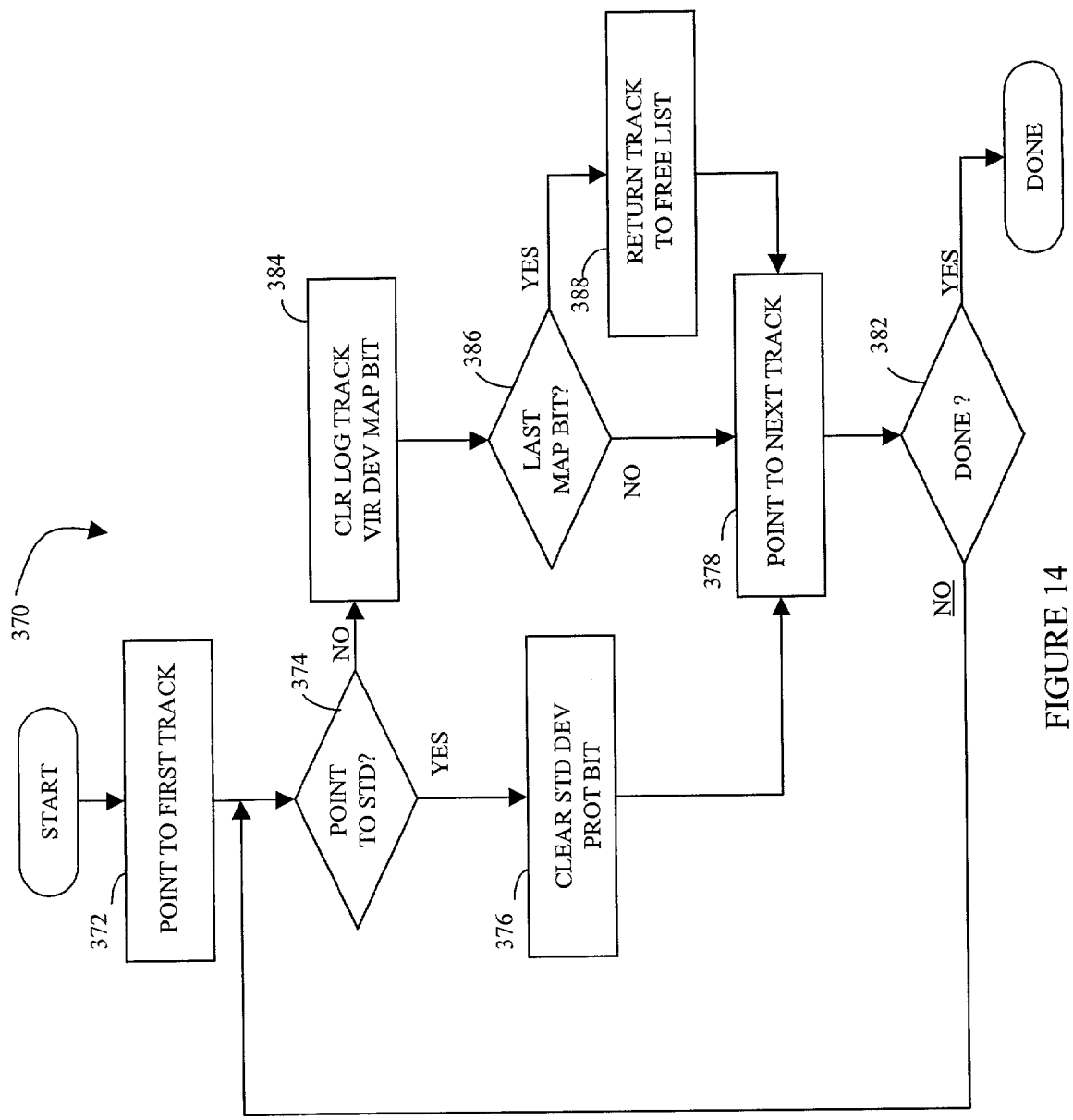
FIG. 14 is a flow chart illustrating steps performed in connection with removing a virtual device.

Referring to FIG. 14, a flow chart 370 illustrates steps performed in connection with removing (i.e., eliminating) a virtual device. Once a virtual device has been established and used for its intended purpose, it may be desirable to remove the virtual device. Processing begins at a first step 372, where a pointer is set to point to the first track of the virtual device. The virtual device is removed by examining each track corresponding to the virtual device.

Following the step 372 is a step 374, where it is determined if the track of the virtual device that is being examined points to the standard logical device. If so, then control transfers from the step 374 to a step 376 to clear the protection bit on the track of the standard logical device corresponding to the virtual device being removed. Following the step 376 is a step 378, where a pointer points to the next track of the virtual device in order to continue processing by examining the next track. Following the step 378 is a step 382, where it is determined if processing complete (i.e., all the tracks of the virtual device have been processed). If not, then control transfers from the step 382 back to the test step 374, discussed above.

If it is determined at the test step 374 that the track of the virtual device being examined does not point to the standard logical device, then control transfers from the step 374 to a step 384, where a virtual device map bit on the track of the log device that corresponds to the virtual device being removed is cleared. Each track of the log device may have a set of virtual device map bits indicating which virtual devices use the track of the log device. Thus, at the step 384, the virtual device map bit corresponding to the virtual device being removed is cleared.

Following the step 384 is a test step 386, where it is determined if the bit that was cleared at the step 384 was the last virtual device map bit that was set for the track. In other words, the test step 386 determines if there are other virtual devices that are using the track on the log device. If it is determined at the test step 386 that the last virtual device map bit was cleared at the step 384 (and thus, no other virtual devices use the track), then control transfers from the step 386 to a step 388, where the track of the log device is returned to the free list of tracks of the log device, discussed elsewhere herein. Following the step 388, or following the step 386 if it is determined that the bit cleared at the step 384 is not the last virtual device map bit of the track of the log device, is the step 378, discussed above, where the next track of the virtual device is pointed to for subsequent examination. Once all of the tracks corresponding to the virtual device have been processed, the tables and other data structures associated with the virtual device may also be removed although, in some embodiments, the tables and other data structures from the virtual device may be maintained, so long as the virtual device is not made available for use by hosts after the virtual device is deestablished.

While the invention has been disclosed in connection with various embodiments, modifications thereon will be readily apparent to those skilled in the art. Accordingly, the spirit and scope of the invention is set forth in the following claims.

What is claimed is:

1. A method of providing a point-in-time copy of stored data, comprising:
   providing a virtual storage area having a table of pointers that point to sections of the stored data and to sections of at least one other storage area, wherein the virtual storage area contains no sections of data;
   in response to a write of new data to a section of the stored data pointed to by a pointer of the table of the virtual storage area, copying the section of stored data to a section of the at least one other storage area prior to the write, causing a pointer of the virtual storage area to point to the section of the at least one other storage area, and writing the new data to the section of the stored data;
   in response to a request for accessing data of the virtual storage area, determining which particular one of the other storage areas contain the data; and
   accessing the data on the particular one of the other storage areas using the table of pointers.

2. A method, according to claim 1, further comprising:
   associating the stored data with the virtual storage area, wherein the virtual storage area represents a copy of the stored data.

3. A method, according to claim 2, further comprising:
   causing all of the pointers of the table to initially point to the stored data when the virtual storage area is initially associated with the stored data.

4. A method, according to claim 3, further comprising:
   associating a data indicator with sections of the stored data, wherein the data indicator for a particular section indicates whether a write operation has been performed to the particular section after the stored data has been associated with the virtual storage area.

5. A method, according to claim 4, further comprising:
   in response to a write to a first section of the stored data and the data indicator indicating that no write operation has been performed to the first section after the stored data has been associated with the virtual storage area, copying data of the first section to a second section that is on the at least one other storage area and causing a corresponding one of the pointers of the table to point to the second section.

6. A method, according to claim 5, further comprising:
following copying the data from the first section to the second section, sending status information to a device that caused the write operation to be performed.

7. A method, according to claim 5, wherein prior to copying data from the first section to the second section, the second section is maintained as a free section containing no data.

8. A method, according to claim 7, further comprising:
maintaining a doubly linked list of all free sections of the second one of the other storage areas.

9. A method, according to claim 1, wherein prior to copying data to a section of the at least one other storage area, the section of the at least one other storage area is maintained as a free section containing no data.

10. A method, according to claim 9, further comprising:
maintaining a doubly linked list of all free sections of the second one of the other storage areas.

11. A method, according to claim 1, wherein each of the sections of data is a track of data.

12. A method, according to claim 1, wherein each of the storage areas is a storage device.

13. A method of providing point-in-time copies of data stored in a data storage area, comprising:
providing a first virtual storage area having a first table of pointers that point to sections of the data storage area and to sections of at least one other storage area, wherein the first virtual storage area contains no sections of data;
in response to a write of new data to a section of the data storage area pointed to by a pointer of the first table of the first virtual storage area, copying the section of data to a section of the at least one other storage area prior to the write, causing a pointer of the first virtual storage area to point to the section of the at least one other storage area, and writing the new data to the section of the data storage area;
associating the data storage area with the first virtual storage area, wherein the first virtual storage area represents a copy of data of the data storage area at a first point in time;
providing a second virtual storage area having a second table of pointers that point to sections of the data storage area and to sections of the at least one other storage area, wherein the second virtual storage area contains no sections of data;
in response to a write to a section of the data storage area pointed to by a pointer of the second table of the second virtual storage area, copying the section of data to a section of the at least one other storage area prior to the write and causing a pointer of the second virtual storage area to point to the section of the at least one other storage area;
associating the data storage area with the second virtual storage area, wherein the second virtual storage area represents a copy of data of the data storage area at a second point in time;
in response to a request for accessing data of one of the virtual storage areas, determining which particular one of the storage areas contain the data; and
accessing the data on the particular one of the storage areas using one of the tables of pointers.

14. A method, according to claim 13, further comprising:
causing all of the pointers of the first table to initially point to sections of the data storage area when the first virtual storage area is initially associated with the data storage area; and
causing all of the pointers of the second table to initially point to sections of the data storage area when the second virtual storage area is initially associated with the data storage area.

15. A method, according to claim 14, further comprising:
associating a first data indicator with sections of the data storage area, wherein the first data indicator for a particular section of the data storage area indicates whether a write operation has been performed to the particular section after the data storage area has been associated with the first virtual storage area; and
associating a second data indicator with sections of the data storage area, wherein the second data indicator for a particular section of the data storage area indicates whether a write operation has been performed to the particular section after the second one of the other storage areas has been associated with the data storage area.

16. A method, according to claim 13, wherein the first time is the same as the second time.

17. A method, according to claim 13, wherein the first time is different from the second time.

18. A method, according to claim 13, wherein each of the sections of data is a track of data.

19. A method, according to claim 13, wherein each of the storage areas is a storage device.

20. A computer program product, comprising:
executable code that provides a virtual storage area having a table of pointers that point to sections of at least two other storage areas, wherein the virtual storage area contains no sections of data and wherein all of the pointers of the table of pointers initially point to a first one of the at least two other storage areas;
executable code that, in response to a write of new data to a section of the first one of the at least two other storage areas, copies the section of the first one of the at least two other storage areas to a section of a second one of the at least two other storage areas, causes a pointer of the virtual storage area to point to the section of the second one of the at least two other storage areas, and writes the new data to the first one of the at least two other storage areas;
executable code that determines which particular one of the at least two other storage areas contain the data in response to a request for accessing data of the virtual storage area; and
executable code that accesses the data on the particular one of the at least two other storage areas using the table of pointers.

21. A computer program product, according to claim 20, further comprising:
executable code that associates the first one of the other storage areas with the virtual storage area, wherein the virtual storage area represents a copy of data of the first one of the other storage areas.

22. A computer program product, according to claim 21, further comprising:
executable code that causes all of the pointers of the table to initially point to sections of the first one of the other storage areas when the virtual storage area is initially associated with the first one of the other storage areas.

23. A computer program product, according to claim 22, further comprising:
executable code that associates a data indicator with sections of the first one of the other storage areas, wherein the data indicator for a particular section indicates whether a write operation has been performed to the particular section after the first one of the other storage areas has been associated with the virtual storage area.

24. A computer program product, according to claim 20, further comprising:

executable code that sends status information to a device that caused the write operation to be performed following copying the data from the first section to the second section.

25. A computer program product, according to claim 20, wherein each of the sections of data is a track of data.

26. A computer program product, according to claim 20, wherein each of the storage areas is a storage device.

* * * * *